United States Patent
Taniguchi (10) Patent No.: US 9,954,567 B2
(45) Date of Patent: Apr. 24, 2018

(54) BASEBAND INTEGRATED CIRCUIT AND RADIO COMMUNICATION DEVICE

(71) Applicant: Kabushiki Kaisha Toshiba, Minato-ku (JP)

(72) Inventor: Kentaro Taniguchi, Kawasaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 0 days.

(21) Appl. No.: 15/242,978

(22) Filed: Aug. 22, 2016

(65) Prior Publication Data
US 2017/0063584 A1 Mar. 2, 2017

(30) Foreign Application Priority Data
Aug. 25, 2015 (JP) .................... 2015-165923

(51) Int. Cl.
*H04L 27/14* (2006.01)
*H04B 1/16* (2006.01)
*H04L 27/227* (2006.01)
*H04W 4/00* (2018.01)

(52) U.S. Cl.
CPC ............. *H04B 1/16* (2013.01); *H04L 27/227* (2013.01); *H04W 4/008* (2013.01)

(58) Field of Classification Search
CPC ......... H04B 1/16; H04L 27/227; H04W 4/008
See application file for complete search history.

(56) References Cited

U.S. PATENT DOCUMENTS

| | | | |
|---|---|---|---|
| 5,883,930 A | 3/1999 | Fukushi | |
| 6,343,207 B1* | 1/2002 | Hessel | H04B 1/0003 455/552.1 |
| 2002/0030546 A1* | 3/2002 | Keating | H03L 7/18 331/2 |
| 2002/0085651 A1* | 7/2002 | Gu | H04L 27/2679 375/344 |
| 2004/0067741 A1* | 4/2004 | Fei | H04L 27/2657 455/192.1 |
| 2004/0223573 A1* | 11/2004 | Brown | H04L 27/2017 375/375 |
| 2008/0123757 A1* | 5/2008 | Ido | H04L 25/0232 375/260 |

FOREIGN PATENT DOCUMENTS

| | | |
|---|---|---|
| JP | 9-298460 A | 11/1997 |
| JP | 2877198 B2 | 1/1999 |
| JP | 2016-39503 A | 3/2016 |
| WO | WO 2016/021466 A1 | 2/2016 |

* cited by examiner

*Primary Examiner* — Syed Haider
(74) *Attorney, Agent, or Firm* — Oblon, McClelland, Maier & Neustadt, L.L.P.

(57) ABSTRACT

According to one embodiment, a baseband integrated circuit is configured to: perform division between a first component of a baseband signal modulated by a minimum shift keying scheme and the first component of a predetermined first synchronization word signal; select the division result corresponding to a frequency offset from among a plurality of division results; interpolate the selected division result; and approximate the interpolated division result by a sine wave, and estimate the frequency offset based on an approximated sine wave.

12 Claims, 9 Drawing Sheets

BASEBAND INTEGRATED CIRCUIT AND RADIO COMMUNICATION DEVICE

CROSS-REFERENCE TO RELATED APPLICATIONS

This application is based upon and claims the benefit of priority from Japanese Patent Application No. 2015-165923, filed Aug. 25, 2015; the entire contents of which are incorporated herein by reference.

FIELD

Embodiments of the present invention relate to a baseband integrated circuit and a radio communication device.

BACKGROUND

Conventionally, as a circuit to receive a minimum shift keying signal and perform frequency correction processing, a reception processing circuit to facilitate demodulation processing and the frequency correction processing by converting an MSK signal to a binary phase shift keying (BPSK) signal is disclosed.

The conventional reception processing circuit converts a radio frequency signal modulated by a minimum shift keying scheme to a BPSK signal by performing frequency conversion by an IQ demodulator, performing AD conversion by an AD converter and detecting an amount of phase offset and an amount of frequency offset between a transmitter and a receiver by an ArcTan circuit.

Then, the reception processing circuit performs initial correction and tracking correction of the phase offset and the frequency offset between the transmitter and the receiver by synchronizing a numerically controlled oscillator (NCO) in a digital baseband with the detected frequency offset and subtracting an output phase of the NCO from phase data after demodulation.

In the frequency correction method by the conventional reception processing circuit, however, since frequency offset correction is performed with the use of an in-phase component and a quadrature component of a received signal, a quadrature demodulator, an analog filter for quadrature component, an AD converter for quadrature component, an ArcTan circuit for phase detection and the like are required. Thus, there is a problem that the circuit scale and power consumption are large.

DETAILED DESCRIPTION

According to one embodiment, a baseband integrated circuit is configured to: perform division between a first component of a baseband signal modulated by a minimum shift keying scheme and the first component of a predetermined first synchronization word signal; select the division result corresponding to a frequency offset from among a plurality of division results; interpolate the selected division result; and approximate the interpolated division result by a sine wave, and estimate the frequency offset based on an approximated sine wave. A baseband integrated circuit according to an embodiment performs division between a first component of a baseband signal modulated by a minimum shift keying scheme and the first component of an already-known first synchronization word signal. A division result corresponding to a frequency offset is selected from among a plurality of division results. The selected division result is interpolated. The interpolated division result is approximated by a sine wave, and the frequency offset is estimated based on the approximated sine wave.

Embodiments of the present invention will be described below with reference to drawings.

First Embodiment

A radio communication device according to a first embodiment will be described with reference to FIGS. 1 to 5. The radio communication device according to the present embodiment receives a packet signal modulated by a minimum shift keying (hereinafter referred to as "MSK") scheme and performs demodulation of data and correction of a frequency offset using only an in-phase component or a quadrature component of the received packet signal.

Figure 1:
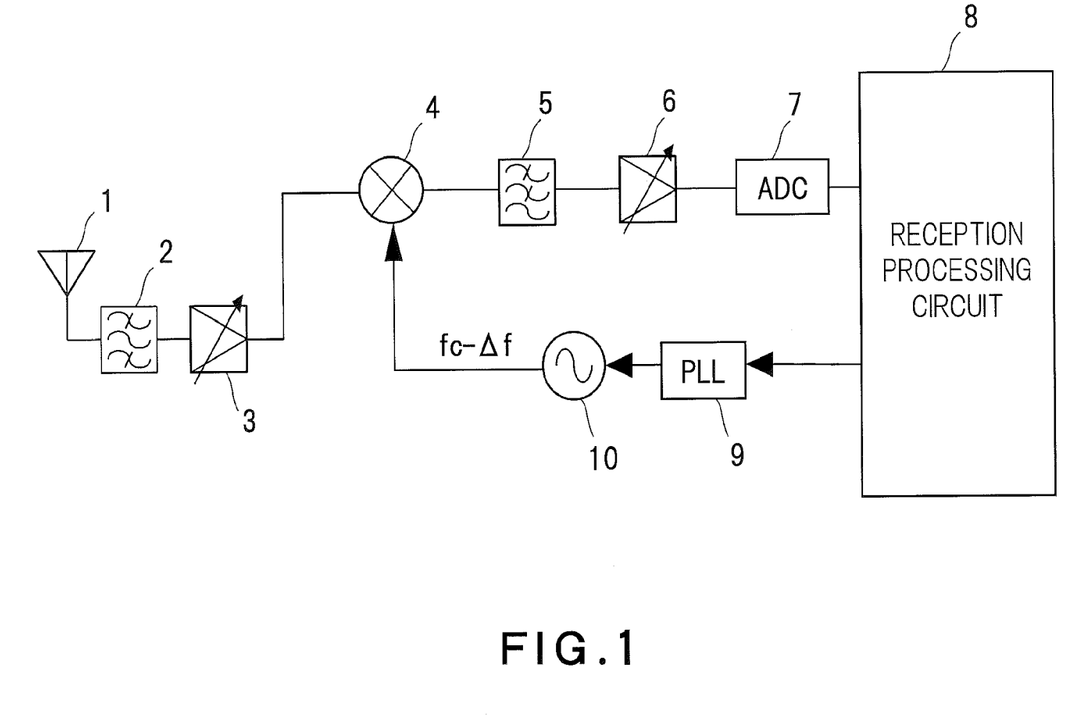
FIG. 1 is a diagram showing an example of a radio communication device according to a first embodiment.

FIG. 1 is a diagram showing an example of the radio communication device according to the present embodiment. As shown in FIG. 1, the radio communication device is provided with an antenna 1, a band-pass filter 2, an amplifier 3, a mixer 4, a low-pass filter 5, an amplifier 6, an AD converter 7, a reception processing circuit 8, a phase synchronization circuit 9 and a local oscillator 10.

The antenna 1 receives a packet signal. The packet signal is a radio frequency (hereinafter referred to as "RF") signal modulated by the MSK scheme. Hereinafter, a packet signal received via the antenna 1 is referred to as a received signal.

The received signal received by the antenna 1 is inputted to the band-pass filter 2 (hereinafter referred to as "BPF 2"), and the BPF 2 causes a signal component of a predetermined frequency band of the inputted received signal to pass through.

The received signal which the BPF 2 has caused to pass through is inputted to the amplifier 3, and the amplifier 3 amplifies the inputted received signal. It is preferable that the amplifier 3 is a low-noise amplifier.

The received signal amplified by the amplifier 3 is inputted to the mixer 4, and the mixer 4 down-converts (frequency-converts) the inputted received signal by mixing the inputted received signal with a local signal. The local signal is supplied from the local oscillator 10.

By the mixer 4 down-converting the received signal, a first component of a baseband (hereinafter referred to as "BB") signal is generated. The first component may be an in-phase component or may be a quadrature component. Hereinafter, description will be made on a case where the first component is an in-phase component as an example. An in-phase component of a BB signal will be referred to as a BB in-phase signal. Details of the BB signal and the local signal will be described later.

The BB in-phase signal generated by the mixer 4 is inputted to the low-pass filter 5 (hereinafter referred to as "LPF 5"), and the LPF 5 causes a low-frequency component of the inputted BB in-phase signal to pass through. Thereby, an unnecessary high-frequency component caused by mixing is removed from the BB in-phase signal.

The BB in-phase signal caused to pass through by the LPF 5 is inputted to the amplifier 6, and the amplifier 6 amplifies the inputted BB in-phase signal to a power level suitable for demodulation processing. It is preferable that the amplifier 6 is a VGA (variable gain amplifier) in which an amplification factor can be changed according to a level of a BB in-phase signal.

The BB in-phase signal amplified by the amplifier 6 is inputted to the AD converter 7 (hereinafter referred to as "ADC 7"), and the ADC 7 AD-converts the inputted BB in-phase signal. Thereby, the BB in-phase signal is converted to a digital signal. As the ADC 7, an arbitrary ADC, such as a flash-type ADC, a ΔΣ-type ADC and a pipeline-type ADC, can be used.

The reception processing circuit 8 performs demodulation processing and frequency correction (hereinafter referred to "AFC") processing of the BB in-phase signal AD-converted by the ADC 7. More specifically, the reception processing circuit 8 estimates a frequency offset and a phase offset included in the received signal based on the BB in-phase signal and inputs an estimation result to the phase synchronization circuit 9. Details of the reception processing circuit 8 will be described later.

The phase synchronization circuit 9 (hereinafter referred to as "PLL 9") controls the local oscillator 10 based on the estimation result inputted from the reception processing circuit 8. Specifically, the PLL 9 causes a frequency and a phase of the local signal supplied by the local oscillator 10 to change so that the frequency offset and the phase offset come close to 0.

The local oscillator 10 supplies a local signal to the mixer 4. A mark frequency or a space frequency of the received signal (that is, an RF signal modulated by the MSK modulation scheme) is set to a frequency of the local signal. The mark frequency is a frequency corresponding to data 1 in the received signal and indicated by "fc+Δf". The space frequency is a frequency corresponding to data 0 in the received signal and indicated by "fc−Δf". In the description below, the mark frequency and the space frequency may be indicated by "fc−Δf" and "fc+Δf", respectively. Further, data indicated by the mark frequency and data indicated by the space frequency may be 0 and 1, respectively.

Here, "fc" indicates a center frequency of the received signal, that is, a frequency of a carrier wave. Further, "Δf" indicates the maximum frequency shift of MSK. Hereinafter, description will be made on a case where the frequency of the local signal is "fc−Δf" as an example.

As described above, the frequency of the local signal is controlled by the PLL 9 so that the frequency offset and the phase offset come close to 0. Thereby, the AFC processing for the received signal is realized.

Figure 2:
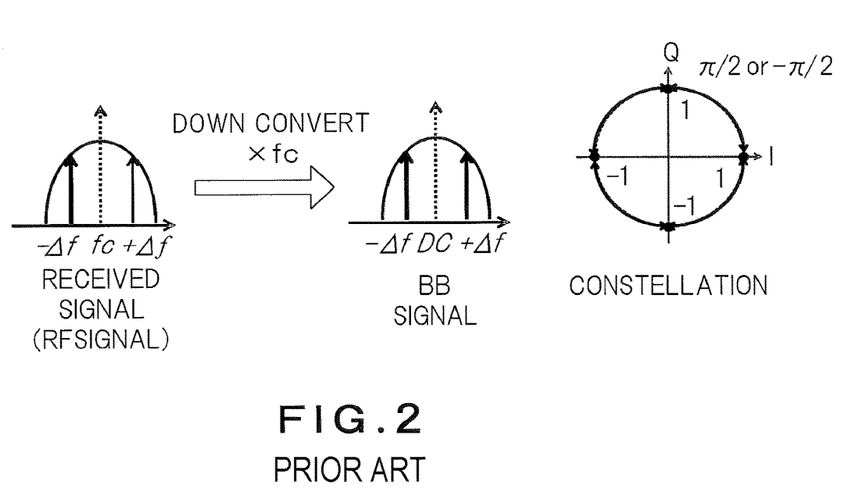
FIG. 2 is a diagram showing a baseband signal constellation in a conventional radio communication device.

Here, FIG. 2 is a diagram showing a BB signal constellation (arrangement of signal points) in a conventional radio communication device. In the conventional radio communication device, a received signal is down-converted with a local signal having a frequency "fc". Therefore, as shown in FIG. 2, a center frequency "fc" of the received signal transitions to "DC" (0 Hz). As a result, the space frequency "fc−Δf" of the received signal transitions to "−Δf", and the mark frequency "fc+Δf" transitions to "Δf". That is, the space frequency and the mark frequency of the BB signal become "−Δf" and "Δf", respectively.

This BB signal becomes such a signal that the phase changes by "−π/2" or "−π/2" for each symbol as shown in FIG. 2. Therefore, by detecting an amount of change in the phase of the BB signal, the BB signal can be demodulated. However, since the signal points of the BB signal exist on each of an I axis (in-phase axis) and a Q axis (quadrature axis) of the constellation as shown in FIG. 2, it is necessary to use both of the in-phase component and the quadrature component of the BB signal in order to detect the amount of change in the phase.

Therefore, the conventional radio communication device requires each of an analog circuit to generate and process the in-phase component of a BB signal (a mixer, an LPF, an amplifier, an ADC and the like) and an analog circuit to generate and process the quadrature component of the BB signal (a mixer, an LPF, an amplifier, an ADC and the like).

Figure 3:
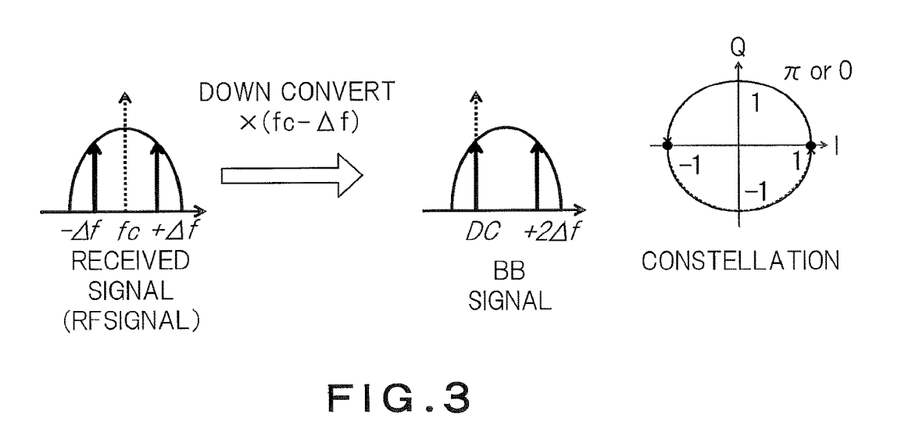
FIG. 3 is a diagram showing a baseband signal constellation in the radio communication device according to the first embodiment.

In comparison, FIG. 3 is a diagram showing a BB signal constellation in the wireless communication device according to the present embodiment. In the radio communication device according to the present embodiment, a received signal is down-converted with a local signal having a space frequency "fc−Δf" as described above. Therefore, as shown in FIG. 3, the center frequency "fc" of the received signal transitions to "Δf". As a result, the space frequency "fc−Δf" of the received signal transitions to "DC", and the mark frequency transitions to "2Δf". That is, the space frequency and the mark frequency of the BB signal become "DC" and "2Δf", respectively.

This BB signal becomes such a signal that the phase changes by 0 or π for each symbol as shown in FIG. 3. As seen from FIG. 3, signal points of the BB signal exist only on the I axis of the constellation. Therefore, in the present embodiment, it is possible to acquire the amount of change in the phase and demodulate data only by detecting polarity change in the in-phase component of the BB signal.

Therefore, in the radio communication device according to the present embodiment, the analog circuit to generate and process the quadrature component of a BB signal (a mixer, an LPF, an amplifier, an ADC and the like) is not required unlike the conventional radio communication device described above. Therefore, according to the present embodiment, it is possible to downsize the circuit scale of the analog circuit of the radio communication device and reduce power consumption.

Further, since the radio communication device according to the present embodiment can demodulate data by detecting polarity of the in-phase component of a BB signal, an ArcTan circuit to detect the phases of the quadrature component and the quadrature component of the BB signal is not required. Therefore, according to the present embodiment, it is possible to downsize the circuit scale of the digital circuit of the radio communication device and reduce power consumption.

Description has been made above on the case of directly down-converting an RF signal to a BB signal. Down-conversion from an RF signal to a BB signal, however, may be in a two-stage configuration through the intermediation of an IF (intermediate frequency) signal. That is, the radio communication device may down-convert an RF signal to an IF signal and then down-convert the IF signal to a BB signal.

Further, the radio communication device may generate the quadrature component of a BB signal (hereinafter referred to as "BB quadrature signal) instead of the in-phase component of the BB signal, and estimate and correct the frequency offset based on the BB quadrature signal. In this case, the analog circuit to generate and process the BB in-phase signal and the ArcTan circuit become unnecessary. Therefore, it is possible to downsize the circuit scale of the analog circuit and digital circuit of the radio communication device and reduce power consumption.

Next, the reception processing circuit 8 according to the present embodiment will be described in detail with reference to FIG. 4. As described above, the reception processing circuit 8 estimates the frequency offset and the phase offset of a received signal.

The frequency offset is a displacement between oscillation frequencies of local oscillators of a transmitter and a receiver. More exactly, an amount of displacement of the oscillation frequencies of the local oscillators of the transmitter and the receiver from an intended frequency is the frequency offset. It is intended below that the frequency "ft" of the local oscillator of a transmitter and the frequency "fr" of the local oscillator of a receiver satisfy "ft=fc" and "fr=fc−Δf", respectively. However, if the oscillation frequencies are displaced to be "ft=fc+Δd1" and "fr=fc−Δf+Δd2", respectively, a frequency offset of "Δd1+Δd2" is caused. Further, the phase offset is a displacement between initial phases of the local oscillators of the transmitter and the receiver.

If there is a frequency offset, the signal points of the BB signal are displaced from desired positions (on the I axis of the constellation), and, therefore, received signal demodulation accuracy decreases. Therefore, the radio communication device according to the present embodiment estimates the frequency offset by the reception processing circuit 8 and corrects an oscillation frequency of the local oscillator 10 based on an estimation result.

Figure 4:
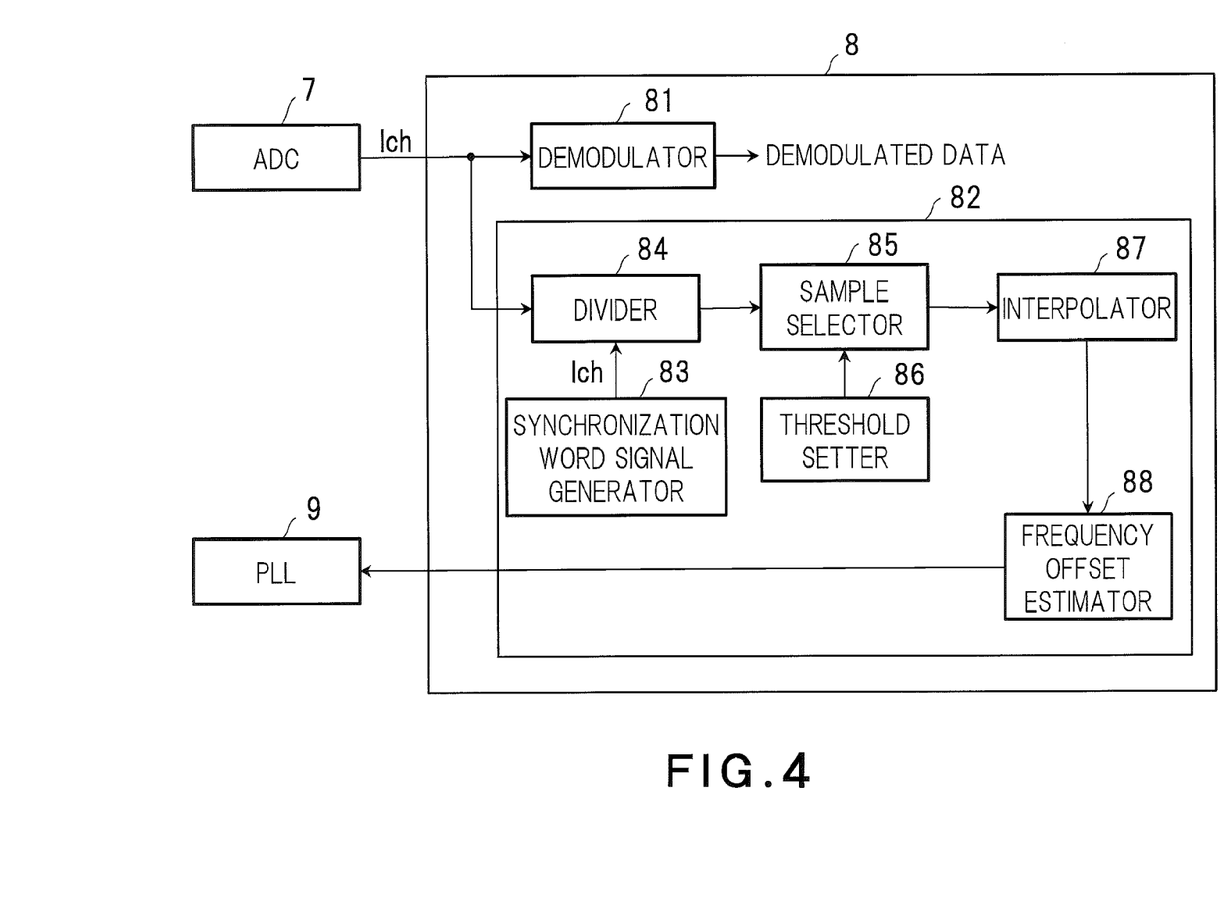
FIG. 4 is a diagram showing an example of a reception processing circuit according to the first embodiment.

FIG. 4 is a diagram showing an example of a configuration of the reception processing circuit 8. As shown in FIG. 4, the reception processing circuit 8 according to the present embodiment is provided with a demodulator 81 and an AFC processor 82.

A BB in-phase signal AD-converted by the ADC 7 is inputted to the demodulator 81. The BB in-phase signal inputted to the demodulator 81 is a digital signal.

The demodulator 81 executes demodulation processing for the inputted BB in-phase signal. Demodulation of the BB in-phase signal is performed by detecting polarity change in the BB in-phase signal. The demodulator 81 outputs demodulated data obtained by the demodulating processing.

A BB in-phase signal is inputted to the AFC processor 82 from the ADC, and the AFC processor 82 executes AFC processing for the inputted BB in-phase signal. As shown in FIG. 4, the AFC processor 82 is provided with a synchronization word signal generator 83, a divider 84, a sample selector 85, a threshold setter 86, an interpolator 87 and a frequency offset estimator 88.

The synchronization word signal generator 83 generates a synchronization word signal "s(t)" (a first synchronization word signal). The synchronization word signal "s(t)" is a complex signal obtained by modulating a synchronization word of the node itself by the MSK scheme so that the space frequency and the mark frequency become "DC" and "2Δf", respectively.

The synchronization word is already-known binary data intended to perform detection of a packet signal, synchronization acquisition, specification of an ID of a destination terminal, and the like. A packet signal includes a synchronization word signal corresponding to such a synchronization word and a payload signal to be a demodulation target. The synchronization word signal arrives prior to the payload signal. All of the already-known binary data that arrives prior to the payload signal may be the synchronization word, or a part of the binary data may be the synchronization word.

The synchronization word signal generator 83 stores the synchronization word of the node itself in an internal memory, and generates a synchronization word signal "s(t)" when a BB in-phase signal is inputted. Then, the synchronization word signal generator 83 inputs an in-phase component (Ich) of the generated synchronization word signal "s(t)" to the divider 84. Hereinafter, the in-phase component of the synchronization word signal "s(t)" will be referred to as a synchronization word in-phase signal "Re{s(t)}".

The synchronization word signal generator 83 may store a synchronization word "s(t)" generated in advance in the internal memory. Further, if a frequency of a local signal is "fc+Δf", the synchronization word signal generator 83 can generate a synchronization word signal "s(t)" obtained by modulating the synchronization word by the MSK scheme so that the space frequency and the mark frequency become "−2Δf" and "DC", respectively. Furthermore, if a BB quadrature signal is inputted from the ADC 7, the synchronization word signal generator 83 can input a quadrature component "Im{s(t)}" of the synchronization word signal "s(t)" to the divider 84.

To the divider 84, a BB in-phase signal is inputted to the divider 84 from the ADC 7, and a synchronization word in-phase signal "Re{s(t)}" is inputted from the synchronization word signal generator 83. The divider 84 performs division of the BB in-phase signal and the synchronization word in-phase signal "Re{s(t)}".

The synchronization word in-phase signal "Re{s(t)}" inputted from the synchronization word signal generator 83 is an in-phase component of an ideal synchronization word signal without a frequency offset. Therefore, if a received signal is a synchronization word in-phase signal without a frequency offset, which is addressed to the node itself, the frequencies of the BB in-phase signal and the synchronization word in-phase signal "Re{s(t)}" correspond to each other.

On the other hand, if the received signal has a frequency offset, a signal obtained as a division result is a signal corresponding to the frequency offset. The signal corresponding to the frequency offset is ideally a sine wave having the same frequency as the frequency offset.

Actually, however, the ideal sine wave cannot be obtained because the division processing does not consider influence of the quadrature component of the BB signal caused by a frequency offset. When the frequency offset of the received signal is indicated by "$F_{ofs}$", the BB in-phase signal becomes "Re{s(t)·exp(j2π$F_{ofs}$t)}". Therefore, a division result is calculated by the following formula:

[Formula 1]

$$\text{Re}\{s(t)\cdot\exp(j2\pi F_{ofs}t)\}/\text{Re}\{s(t)\} = [\text{Re}\{s(t)\}\cdot\cos(2\pi F_{ofs}t) - \text{Im}\{s(t)\}\cdot\sin(2\pi F_{ofs}t)]/\text{Re}\{s(t)\}$$
$$= \cos(2\pi F_{ofs}t) - \sin(2\pi F_{ofs}t)\cdot\text{Im}\{s(t)\}/\text{Re}\{s(t)\} \quad (1)$$

As shown in Formula (1), the division result includes a first term and a second term. The first term is the above-described ideal sine wave corresponding to the frequency offset "$F_{ofs}$". The second term is an error caused by the quadrature component of the BB signal due to the frequency offset "$F_{ofs}$". Thus, the ideal sine wave cannot be obtained because the division result includes the error.

The divider 84 executes the calculation of Formula (1) at predetermined time intervals. A value obtained by each calculation is referred to as a sample. The divider 84 inputs a plurality of samples obtained by the division processing to the sample selector 85 as division results.

The sample selector 85 removes abnormal samples from the samples inputted from the divider 84 to select normal samples. The abnormal samples are samples which are significantly influenced by the second term of Formula (1). In comparison, the normal samples are samples which are little influenced by the second term of Formula (1).

Specifically, the sample selector 85 calculates a differential value of each sample and select normal samples based on the obtained differential values. The differential value of each sample is calculated by the following formula.

[Formula 2]

$$\frac{d}{dt}[\text{Re}\{s(t)\cdot\exp(j2\pi F_{ofs}t)\}/\text{Re}\{s(t)\}] = \frac{d}{dt}[\cos(2\pi F_{ofs}t) - \sin(2\pi F_{ofs}t)\cdot\text{Im}\{s(t)\}/\text{Re}\{s(t)\}]$$
$$= -2\pi F_{ofs}\sin(2\pi F_{ofs}t) - \frac{d}{dt}[\sin(2\pi F_{ofs}t)\cdot\text{Im}\{s(t)\}/\text{Re}\{s(t)\}] \quad (2)$$

As seen from Formula (2), the differential value of the first term of a sample is a value within a range of "$[-2\pi F_{ofs}, 2\pi F_{ofs}]$". On the other hand, the differential value of the second term of the sample steeply changes in comparison with the differential value of the first term because a differential value of the synchronization word "s(t)" is included. Therefore, a sample the differential value of which is included within the range of "$[-2\pi F_{ofs}, 2\pi F_{ofs}]$" is considered to be a normal sample which is little influenced by the second term.

Therefore, the sample selector 85 selects samples the differential values of which are within a predetermined range, as normal samples, and removes samples the differential values of which are outside the predetermined range, as abnormal samples. The sample selector 85 inputs the selected samples to the interpolator 87.

The threshold setter 86 sets a threshold for the sample selector 85 to select normal samples. As described above, the samples the differential values of which are within the range of "$[-2\pi F_{ofs}, 2\pi F_{ofs}]$" are considered to be a normal samples. However, since the frequency offset "$F_{ofs}$" is an estimation target itself, it is not used as a threshold.

Therefore, the threshold setter 86 sets the maximum value $F_{max}$ of a frequency offset to be corrected as a threshold. The sample selector 85 selects samples the differential values of which are included within a range specified by this threshold, that is, "$[-2\pi F_{max}, 2\pi F_{max}]$", as normal samples. Thereby, it is possible to select samples corresponding to a frequency offset equal to or below the threshold $F_{max}$.

For example, the threshold $F_{max}$ may be set based on performance of the local oscillator 10 or may be set based on a radio standard for MSK signals received by the radio communication device. For example, if the radio communication device receives a packet signal in accordance with the BLE (Bluetooth Low Energy) standard, which is modulated by a GMSK (Gaussian minimum shift keying) scheme, it is conceivable to set the threshold $F_{max}$ to 100 kHz. This is because the maximum frequency offset is specified as 100 kHz in the BLE standard. By setting the threshold $F_{max}$ as described above, it is possible to select samples corresponding to a frequency offset within a range specified by a standard.

The interpolator 87 executes interpolation processing for the samples inputted from the sample selector 85. An arbitrary interpolation method, such as linear interpolation, polynomial interpolation and spline interpolation, can be used for the sample interpolation processing. The interpolator 87 inputs the interpolated samples to the frequency offset estimator 88.

The frequency offset estimator 88 estimates the frequency offset "$F_{ofs}$" based on the samples interpolated by the interpolator 87. Specifically, the frequency offset estimator 88 approximates the interpolated samples with a sine wave. The frequency offset estimator 88 can approximates the sine wave, for example, based on a cycle of polarity reversal of the interpolated samples, time width between the maximum amplitudes, time width between the minimum amplitudes and the like.

A frequency of the approximated sine wave becomes an estimated value "$F_{ofs}$'" of the frequency offset "$F_{ofs}$", and the initial phase becomes an estimated value "$\varphi$" of a phase offset "$\varphi$". This is because a set of normal samples becomes a sine wave corresponding to the frequency offset "$F_{ofs}$". The frequency offset estimator 88 inputs the estimation result to the PLL 9.

The PLL 9 to which the estimation result has been inputted from the frequency offset estimator 88 controls the local signal of the local oscillator 10 in accordance with the inputted estimation result. Specifically, the PLL 9 causes the frequency of the local signal to transition to "fc−Δf−$F_{ofs}$'". Further, the PLL 9 causes the phase of the local signal to transition by "−$\varphi$". Thereby, it is possible to correct the frequency offset and the phase offset of the received signal.

Figure 5:
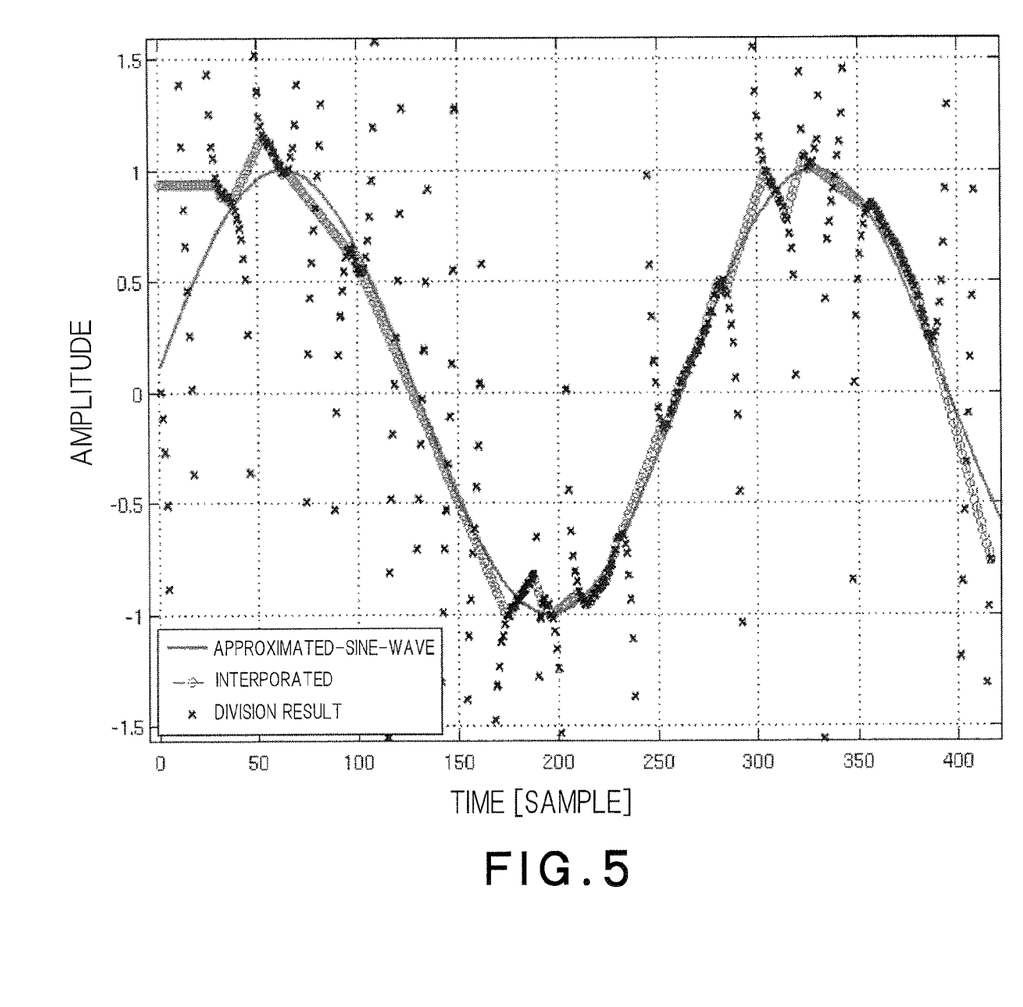
FIG. 5 is a diagram showing an example of estimation results of a frequency offset and a phase offset.

FIG. 5 is a diagram showing an example of results of estimation of the frequency offset and the phase offset by the frequency offset estimator 88. In FIG. 5, x marks indicate samples outputted by the divider 84; ○ marks indicate samples interpolated by the interpolator 87; and a solid line indicates a sine wave approximated by the frequency offset estimator 88.

As seen from FIG. 5, the samples outputted by the divider 84 include samples the inclinations (differential values) of which are within a predetermined range and samples the inclinations of which diverge. The samples the inclinations of which are within the predetermined range are normal samples corresponding to the frequency offset "$F_{ofs}$", and the samples the inclinations of which diverge are abnormal samples significantly influenced by the second term of Formula (2).

As shown in FIG. 5, it is seen that, by performing interpolation among the normal samples, a waveform close to a sine wave can be obtained. By approximating the sine wave to this waveform, the frequency offset estimator 88 can estimate the frequency offset "$F_{ofs}$" and the phase offset "φ".

As described above, the reception processing circuit 8 according to the present embodiment can estimate the frequency offset "$F_{ofs}$" and the phase offset "φ" using only a BB in-phase signal or a BB quadrature signal. Further, the reception processing circuit 8 does not require the ArcTan circuit to detect the phases of the BB in-phase signal and the BB quadrature signal. Therefore, according to the present embodiment, it is possible to downsize the circuit scale of the reception processing circuit 8 and reduce power consumption.

Second Embodiment

A wireless communication device according to a second embodiment will be described with reference to FIGS. 6 and 7. In the first embodiment, description has been made on AFC processing in the case where a radio communication device receives a synchronization word signal addressed to the node itself.

Actually, however, there may be a case where the radio communication device receives a synchronization word signal addressed to another node. Therefore, it is necessary for the radio communication device to judge whether a received synchronization word signal is addressed to the node itself or not. That is, it is necessary for the radio communication device to confirm whether a synchronization word obtained by demodulating a received synchronization word signal corresponds to the synchronization word of the node itself.

Therefore, in the present embodiment, description will be made on a radio communication device which demodulates a received synchronization word signal after correcting the frequency offset "$F_{ofs}$". It is assumed below that the received signal is a synchronization word signal addressed to the node itself or addressed to another node. Further, a BB in-phase signal generated from a received signal will be referred to as a received synchronization word signal.

Figure 6:
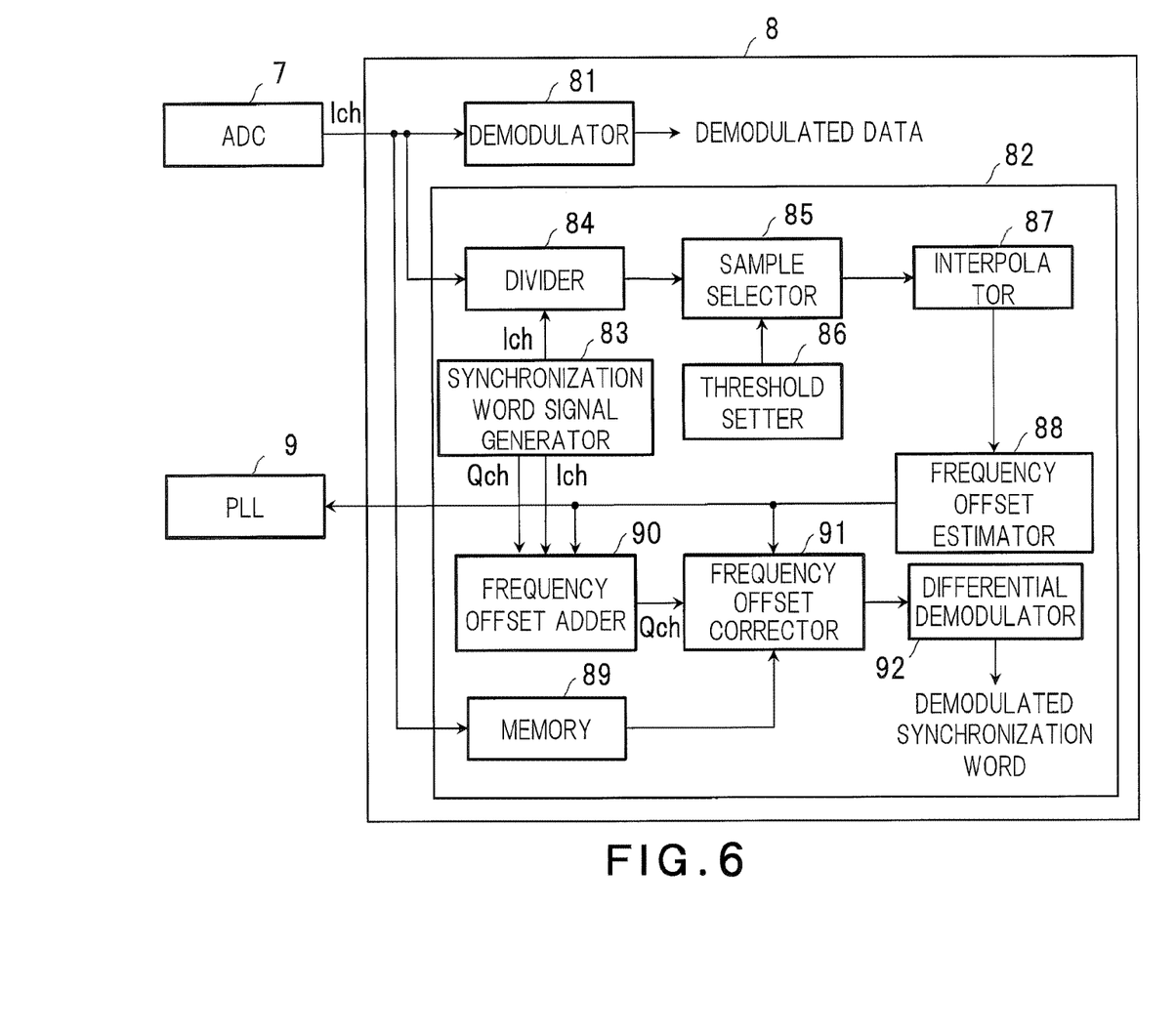
FIG. 6 is a diagram showing an example of a reception processing circuit according to a second embodiment.

FIG. 6 is a diagram showing an example of a reception processing circuit 8 according to the present embodiment. As shown in FIG. 6, this reception processing circuit 8 is provided with a memory 89, a frequency offset adder 90, a frequency offset corrector 91 and a differential demodulator 92. Other components are similar to those of the first embodiment.

A received synchronization word signal is inputted to the memory 89 from the ADC 7, and the memory 89 stores the inputted received synchronization word signal. If a received signal is addressed to the node itself, the received synchronization word signal is indicated as "Re{s(t)·exp(j2πF$_{ofs}$t+jφ)}". The memory 89 inputs the stored received synchronization word signal to the frequency offset corrector 91.

An estimated value "$F_{ofs}$'" of a frequency offset and an estimated value "φ'" of a phase offset are inputted to the frequency offset adder 90 from the frequency offset estimator 88. Further, each of a synchronization word in-phase signal "Re{s(t)}" and a synchronization word quadrature signal "Im{s(t)}" are inputted from the synchronization word signal generator 83.

The frequency offset adder 90 generates a synchronization word signal "$s_2(t)$" (a second synchronization word signal) by adding the estimated value "$F_{ofs}$'" of the frequency offset and the estimated value "φ'" of the phase offset to a synchronization word signal "s(t)" inputted from the synchronization word signal generator 83. The synchronization word signal "$s_2(t)$" is expressed by the following formula.

[Formula 3]

$$s_2(t) = s(t) \cdot \exp(j2\pi F_{ofs}'t + j\varphi') \quad (3)$$

The frequency offset adder 90 inputs a quadrature component (Qch) of the generated synchronization word signal "$s_2(t)$" to the frequency offset corrector 91.

The estimated value "$F_{ofs}$'" of the frequency offset and the estimated value "φ'" of the phase offset are inputted to the frequency offset corrector 91 from the frequency offset estimator 88. Further, to the frequency offset corrector 91, a received synchronization word signal is inputted from the memory 89, and a quadrature component "Im{$s_2(t)$}" of a synchronization word signal is inputted from the frequency offset adder 90.

The synchronization word signal "$s_2(t)$" is a complex signal and has a frequency offset and a phase offset corresponding to the received synchronization word signal. Therefore, the frequency offset corrector 91 can generate a complex signal "$s_3(t)$" based on the quadrature component "Im{$s_2(t)$}" of the synchronization word signal "$s_2(t)$" and the received synchronization word signal. The complex signal "$s_3(t)$" is expressed by the following formula.

[Formula 4]

$$\begin{aligned}s_3(t) &= \text{Re}\{s(t) \cdot \exp(j2\pi F_{ofs}t + j\phi)\} + \\ &\quad j \cdot \text{Im}\{s(t) \cdot \exp(j2\pi F_{ofs}'t + j\phi')\} \\ &\cong s(t) \cdot \exp(j2\pi F_{ofs}t + j\phi)\end{aligned} \quad (4)$$

Next, the frequency offset corrector 91 removes the estimated value "$F_{ofs}$'" of the frequency offset and the estimated value "φ'" of the phase offset from the complex signal "$s_3(t)$". That is, the following formula is calculated.

[Formula 5]

$$\begin{aligned}s_3(t) \cdot \exp(-j2\pi F_{ofs}'t - j\phi') &\cong s(t) \cdot \exp(j2\pi F_{ofs}t + j\phi) \cdot \\ &\quad \exp(-j2\pi F_{ofs}'t - j\phi') \\ &\cong s(t)\end{aligned} \quad (5)$$

As seen from Formula (5), the frequency offset corrector 91 can generate a synchronization word signal "s(t)" from which the frequency offset "$F_{ofs}$" and the phase offset "φ" are removed, if the received synchronization word signal is addressed to the node itself. The synchronization word signal "s(t)" is a complex signal. The frequency offset corrector 91 inputs the synchronization word signal "s(t)" obtained in this way to the differential demodulator 92.

The differential demodulator 92 demodulates the synchronization word signal "s(t)" inputted from the frequency offset corrector 91. The synchronization word signal "s(t)" has the constellation shown in FIG. 3. Therefore, the phase between symbols changes by 0 in the space signal (data 0), and the phase changes by π in the mark signal (data 1). The differential demodulator 92 demodulates the synchronization word signal "s(t)" by detecting such phase change.

Figure 7:
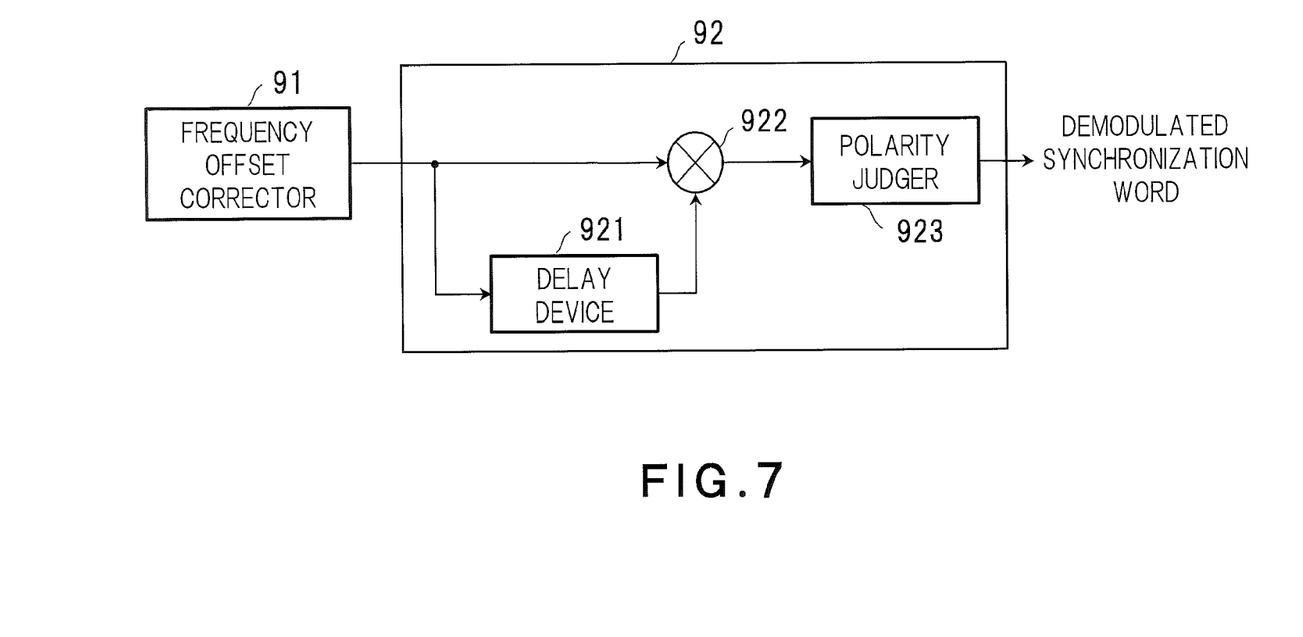
FIG. 7 is a diagram showing an example of a differential demodulator according to the second embodiment.

FIG. 7 is a diagram showing an example of the differential demodulator 92. The differential demodulator 92 in FIG. 7 is provided with a delay device 921 and a multiplier 922 and a polarity judger 923.

The synchronization word signal "s(t)" is inputted to the delay device 921 from the frequency offset corrector 91. The delay device 921 delays the inputted synchronization word signal "s(t)" by one symbol to output the synchronization word signal "s(t)".

To the multiplier 922, the synchronization word signal "s(t)" is inputted from the frequency offset corrector 91, and the delayed synchronization word signal "s(t)" is inputted from the delay device 921. The multiplier 922 multiplies the inputted two synchronization word signals "s(t)". That is, the delay device 921 multiplies a synchronization word signal "s(t)" corresponding to a demodulation target symbol and a synchronization word signal corresponding to a symbol immediately before the symbol. The multiplier 922 inputs a multiplication result to the polarity judger 923.

The polarity judger 923 judges the demodulation target symbol based on polarity of the multiplication result inputted from the multiplier 922. The polarity judger 923 judges that the demodulation target is a space signal (data 0) if the polarity is positive and judges that the demodulation target is a mark signal (data 1) if the polarity is negative. The polarity judger 923 outputs a judgment result. Binary data obtained as the judgment result of the polarity judger 923 becomes a demodulated synchronization word.

As described above, if receiving a synchronization word signal addressed to the node itself, the radio communication device according to the present embodiment can demodulate the synchronization word signal after correcting the frequency offset and the phase offset. The radio communication device can judge whether the synchronization word signal is addressed to the node itself, using the demodulated synchronization word.

More specifically, if the received synchronization word signal is addressed to the node itself, the synchronization word signal "s(t)" is demodulated, and, therefore, the demodulated synchronization word corresponds to the synchronization word of the node itself. Therefore, the radio communication device can judge that the received synchronization word signal is addressed to the node itself.

Further, if the received synchronization word signal is addressed to another node, Formulas (4) and (5) are not satisfied. As a result, the demodulated signal is a signal different from the synchronization word signal "s(t)", and the demodulated synchronization word and the synchronization word of the node itself do not correspond to each other. Therefore, the radio communication device can judge that the received synchronization word signal is addressed to another node.

Third Embodiment

A radio communication device according to a third embodiment will be described with reference to FIG. 8. In the present embodiment, description will be made on a radio communication device which performs frequency tracking processing after the AFC processing using a synchronization word signal. The frequency tracking processing is processing for correcting a frequency offset remaining after the AFC processing and a frequency offset caused by a frequency drift of the local oscillator 10 (or an oscillator on a transmitter side).

Though it is necessary to perform the frequency tracking processing even while an unknown payload signal is being received, it is not possible to estimate a frequency offset using an already-known synchronization word while the payload signal is being received. Therefore, the radio communication device according to the present embodiment performs blind estimation processing using an unknown payload signal. Hereinafter, a received signal is assumed to be a payload signal. Further, a BB in-phase signal generated from a payload signal will be referred to as a received payload signal.

Figure 8:
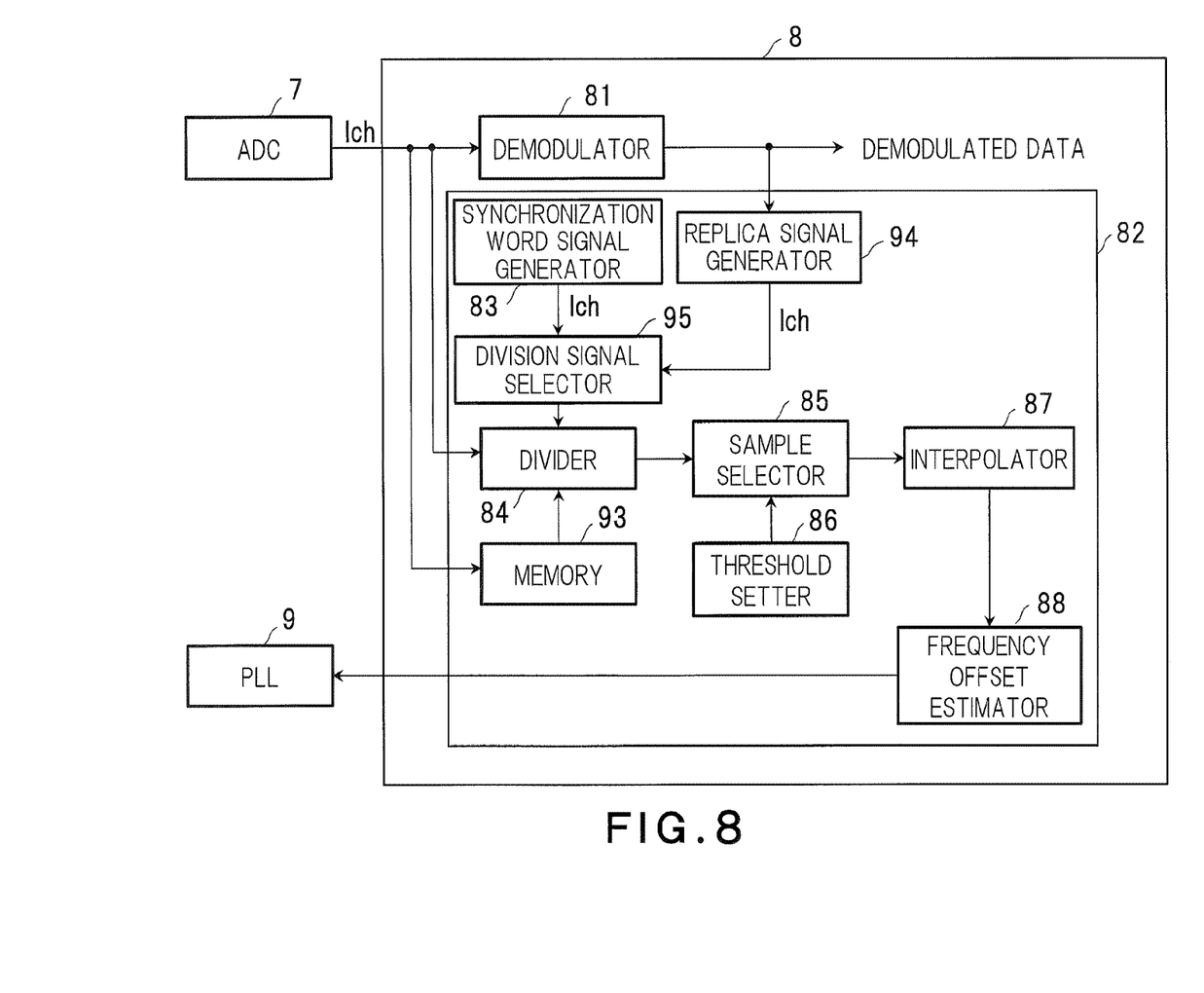
FIG. 8 is a diagram showing an example of a reception processing circuit according to a third embodiment.

FIG. 8 is a diagram showing an example of a reception processing circuit 8 according to the present embodiment. As shown in FIG. 8, this reception processing circuit 8 is provided with a memory 93, a replica signal generator 94 and a division signal selector 95. Other components are similar to those of the first embodiment.

A received payload signal is inputted to the memory 93 from the ADC 7, and the memory 93 stores the inputted received payload signal. The memory 93 inputs the stored received payload signal to the divider 84 after a processing latency of the demodulator 81, the replica signal generator 94 and the division signal selector 95 elapses.

A payload obtained by the demodulator 81 demodulating the received payload signal is inputted to the replica signal generator 94. The payload is binary data. The replica signal generator 94 generates a replica signal based on the demodulated payload. The replica signal is a complex signal obtained by modulating the demodulated payload by the MSK scheme so that the space frequency and the mark frequency become "DC" and "2Δf", respectively. The replica signal generator 94 inputs an in-phase component (Ich) of the generated replica signal to the division signal selector 95. The in-phase component of the replica signal is referred to as a replica in-phase signal.

A synchronization word in-phase signal and the replica in-phase signal being inputted, the division signal selector 95 selects one of the signals and inputs the signal to the divider 84. If a received signal is a synchronization word signal, the division signal selector 95 inputs a synchronization word in-phase signal to the divider 84. Thereby, the AFC processing described in the first embodiment is realized. The division signal selector 95 judges whether a received signal is a synchronization word signal or not based on a time synchronization judgment result by a time synchronization judger not shown. The time synchronization judger judges which part of a packet signal is being received, and communicates a result to the division signal selector 95.

Further, if a received signal is a payload signal, the division signal selector 95 inputs a replica in-phase signal to the divider 84. Thereby, to the divider 84, the received payload signal is inputted from the memory 93, and the replica in-phase signal is inputted from the division signal selector 95. Then, the divider 84 performs division of the replica in-phase signal and the received payload signal. The subsequent process is similar to that of the first embodiment. That is, the sample selector 85 selects normal samples from a division result inputted from the divider 84; the interpolator 87 interpolates the selected normal samples; and the frequency offset estimator 88 estimates the frequency offset "$F_{ofs}$" based on the interpolated samples.

As described above, if a received signal is a payload signal, the radio communication device according to the present embodiment can estimate a frequency offset and a phase offset of the received signal based on the received payload signal and a replica in-phase signal generated from the received payload signal. That is, in the present embodiment, a replica in-phase signal plays a role of the synchronization word signal "s(t)" in the first embodiment. Therefore, the radio communication device according to the present embodiment can execute the frequency tracking processing even while a payload signal is being received.

Fourth Embodiment

Figure 9:
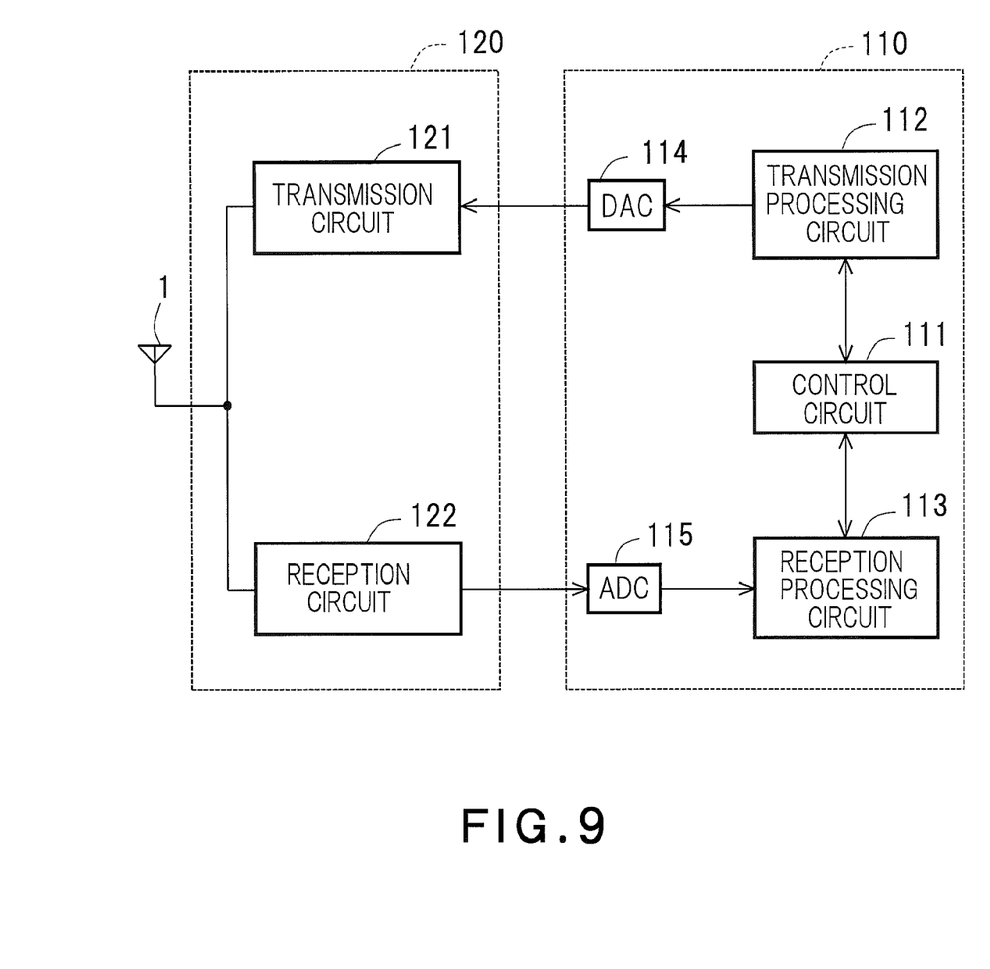
FIG. 9 is a diagram showing an example of a radio communication device according to a fourth embodiment.

A radio communication device according to a fourth embodiment will be described with reference to FIGS. 9 to 11. FIG. 9 is a diagram showing an example of the radio communication device according to the present embodiment. As shown in FIG. 9, the radio communication device according to the present embodiment is provided with a BB integrated circuit 110, an RF integrated circuit 120 and the antenna 1.

The BB integrated circuit 110 is provided with a control circuit 111, a transmission processing circuit 112, a reception processing circuit 113, a DAC (digital/analog converter) 114 and an ADC 115. The control circuit 111, the transmission processing circuit 112 and the reception processing circuit 113 in the BB integrated circuit 110 perform digital signal processing. A digital transmission signal generated by the transmission processing circuit 112 is converted to an analog transmission signal by the DAC 114 and then inputted to the RF integrated circuit 120. Otherwise, it is also possible to input a digital transmission signal directly to the RF integrated circuit 120, without providing the DAC 114, and directly modulate a PLL (phase locked loop) circuit to generate an analog transmission signal.

The reception processing circuit 113 corresponds to the reception processing circuit 8 in each of the above embodiments. Further, the ADC 115 corresponds to the ADC 7 in each of the above embodiments.

The control circuit 111 performs, for example, processing of a MAC (media access control) layer. The control circuit 111 may perform processing of a network layer upper than the MAC layer. Further, the control circuit 111 may perform processing related to MIMO (multi-input multi-output). For example, the control circuit 111 may perform propagation path estimation processing, transmission weight calculation processing, stream separation processing and the like.

The transmission processing circuit 112 generates a digital transmission signal. The reception processing circuit 113 performs processing, such as analysis of a synchronization word, a preamble and a physical header, after performing demodulation and decoding.

The RF integrated circuit 120 is provided with a transmission circuit 121 and a reception circuit 122. The transmission circuit 121 is provided with a transmission filter to extract a signal of a transmission band, a mixer to up-convert the signal which has passed through the transmission filter to be of a radio frequency, an amplifier to amplify the up-converted signal, and the like though they are not shown.

The reception circuit 122 is provided with the BPF 2, the amplifier 3, the mixer 4, the LPF 5, the amplifier 6, the PLL 9 and the local oscillator 10 in each of the above embodiments. Though being provided with one antenna 1 in the example in FIG. 9, the radio communication device may be provided with a plurality of antennas 1.

In a case of performing transmission/reception of a radio signal with each antenna 1, the RF integrated circuit 120 may be provided with a switch for connecting any one of the transmission circuit 121 and the reception circuit 122 to the antenna. If such a switch is provided, it is possible to connect the antenna to the transmission circuit 121 at the time of transmission and connect the antenna to the reception circuit 122 at the time of reception.

The RF integrated circuit 120 and the BB integrated circuit 110 shown in FIG. 9 may be integrated in one chip or may be different chips. Further, it is also possible to configure a part of the RF integrated circuit 120 and the BB integrated circuit 110 with discrete parts and configure the remainder with one or more chips.

Furthermore, the RF integrated circuit 120 and the BB integrated circuit 110 may be configured with software radio sets which are reconfigurable as software. In this case, the functions of the RF integrated circuit 120 and the BB integrated circuit 110 can be realized by software, with the use of a digital signal processing processor. In this case, a bus, the processor and an external interface are provided inside the radio communication device shown in FIG. 9. The processor and the external interface are connected via the bus, and firmware operates on the processor. The firmware can be updated by a computer program. By the processor causing the firmware to operate, the RF integrated circuit 120 and the BB integrated circuit 110 shown in FIG. 9 can perform processing operation.

The radio communication device shown in FIG. 9 is applicable to a stationary radio communication device such as an access point, a radio router and a computer, applicable to a portable radio terminal such as a smartphone and a mobile telephone, applicable to peripheral device such as a mouse and a keyboard for performing radio communication with a host device, applicable to a card-shaped member including a radio function (such as an IC card, a memory card and a SIM card), and applicable to a wearable terminal for performing radio communication of biological information. A scheme for radio communication between the radio communication devicees shown in FIG. 9 is not especially limited. Various schemes, such as cellular communication of the third and succeeding generations, wireless LAN, Bluetooth® and proximity radio communication, are usable.

Figure 10:
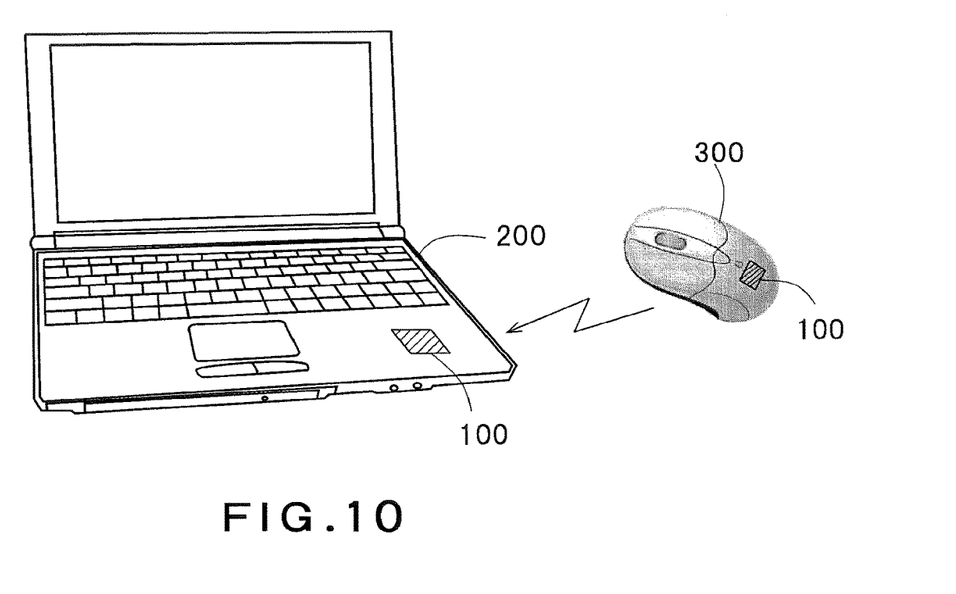
FIG. 10 is a diagram showing an example of a host device provided with a radio notification device and a peripheral device according to the fourth embodiment.

FIG. 10 shows an example of performing radio communication between a PC 200 which is a host device, and a mouse 300 which is a peripheral device. A radio communication device 100 shown in FIG. 9 is included in both of the PC 200 and the mouse 300 in FIG. 10. The mouse 300 performs radio communication using power of a built-in battery. However, since space for including the battery is restricted, it is necessary to perform radio communication with as low power consumption as possible. Therefore, it is desirable to perform radio communication using a radio scheme making it possible to perform low-consumption radio communication, such as BLE formulated in the Bluetooth® 4.0 standard.

Figure 11:
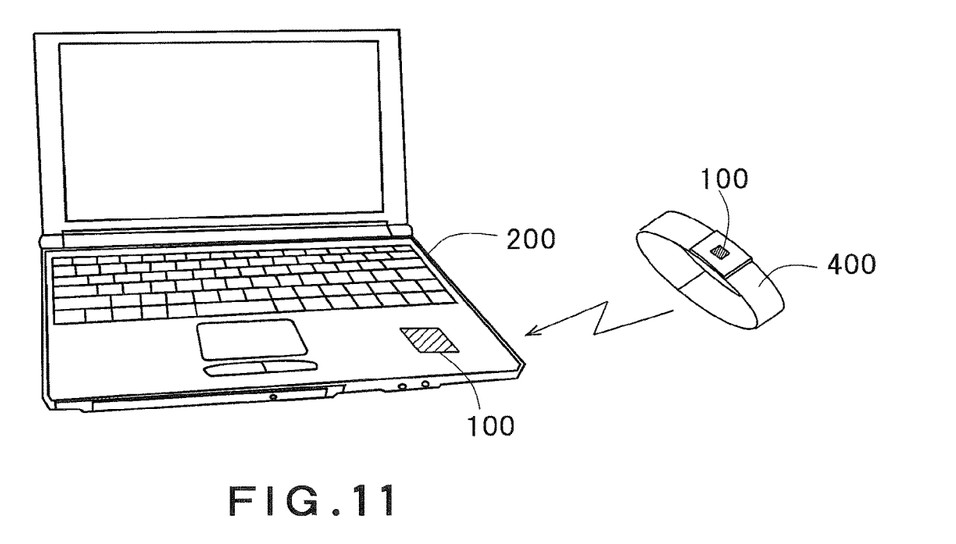
FIG. 11 is a diagram showing an example of the host device provided with the radio notification device and a wearable terminal according to the fourth embodiment.

FIG. 11 shows an example of performing radio communication between a wearable terminal 400 and a host device (for example, the PC 200). The wearable terminal 400 is fitted to a human body, and not only the type of being fitted to an arm as in FIG. 11 but also various types, such as a type of being applied to a body such as a seal type, a type of being fitted to a body part other than the arm such as a glasses type and an earphones type, and a type of being inserted into a body such as a pacemaker, are conceivable. In the case of FIG. 11 also, the radio communication device 100 shown in FIG. 9 is included in both of the wearable terminal 400 and the PC 200.

The PC 200 is a computer, a server or the like. Since the wearable terminal 400 is also fitted to a human body, space for a built-in battery is restricted. Therefore, it is desirable to adopt a radio scheme making it possible to perform radio communication with low power consumption such as BLE described above.

Further, in the case of performing radio communication between the radio communication devices shown in FIG. 9, the kind of information transmitted and received through the radio communication is not especially limited. However, it is desirable to change the radio scheme in the case of transmitting/receiving information with a large amount of data, such as movie data, and in the case of transmitting/receiving information with a small amount of data, such as information about operation of the mouse 300, and it is necessary to perform radio communication by an optimum radio scheme according to the amount of information transmitted/received.

Furthermore, in the case of performing radio communication between the radio communication devicees shown in FIG. 9, a notifier to notifying an operation state of the radio communication to a user may be provided. As a specific example of the notifier, for example, the operation state may be displayed on a display device such as an LED, the operation state may be notified by vibration of a vibrator, and the operation state may be notified by voice information by a speaker, a buzzer or the like.

At least a part of the radio communication device described in the above embodiments may be configured with hardware or with software. In the case of configuring at least a part of the radio communication device with software, a program for realizing at least a part of functions of the radio communication device may be contained in a recording medium such as a flexible disk and a CD-ROM, caused to be read into a computer and executed. The recording medium is not limited to a removable medium such as a magnetic disk and an optical disk but may be a fixed-type recording medium such as a hard disk device and a memory.

Further, the program for realizing at least a part of the functions of the radio communication device may be distributed via a communication line such as the Internet (including radio communication). Furthermore, the program may be distributed in a state of being encrypted, modulated or compressed, via a wired line or a radio line such as the Internet, or being contained in a recording medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A baseband integrated circuit, wherein
the baseband integrated circuit is configured to:
perform division between one component of an in-phase component and a quadrature component of a baseband signal modulated by a minimum shift keying scheme and one component, of an in-phase component and a quadrature component of a predetermined first synchronization word signal, corresponding to the one component of the baseband signal;
select division results having a differential component that is equal to or below a predetermined value from among a plurality of division results of the division between the one component of the baseband signal and the one component of the predetermined first synchronization word signal;
interpolate the selected division results; and
approximate the interpolated division results by a sine wave, and estimate a frequency offset based on the approximated sine wave.

2. The baseband integrated circuit according to claim 1, wherein the first synchronization word signal is a complex signal obtained by modulating predetermined binary data by the minimum shift keying scheme.

3. The baseband integrated circuit according to claim 1, wherein the selected division results are linearly interpolated, polynomially interpolated, or splinely interpolated.

4. The baseband integrated circuit according to claim 1, wherein a frequency of the sine wave is estimated as the frequency offset.

5. The baseband integrated circuit according to claim 1, wherein the baseband integrated circuit is configured to
add the estimated frequency offset to the first synchronization word signal to generate a second synchronization word signal;
generate a complex signal comprising the one component of the baseband signal and one component, of an in-phase component and a quadrature component of the second synchronization word signal, corresponding to the other component of the in-phase component and the quadrature component of the baseband signal;
remove the estimated frequency offset from the generated complex signal; and
demodulate the complex signal after the removal.

6. The baseband integrated circuit according to claim 1, wherein the baseband integrated circuit is configured to
generate a replica signal based on binary data obtained by demodulating the one component of the baseband signal; and
perform division between the one component of the baseband signal and one component, of an in-phase component and a quadrature component of the replica signal corresponding to the one component of the baseband signal.

7. The baseband integrated circuit according to claim 6, wherein the replica signal is generated by modulating the binary data obtained by demodulating the one component of the baseband signal by the minimum shift keying scheme.

8. A radio communication device comprising:
an antenna configured to receive a radio frequency signal modulated by a minimum shift keying scheme; and
a radio frequency integrated circuit to generate one component of an in-phase component and a quadrature component of a baseband signal based on the radio frequency signal; and
a baseband integrated circuit configured to:
perform division between the one component of the baseband signal and one component, of an in-phase component and a quadrature component of a predetermined first synchronization word signal, corresponding to the one component of the baseband signal;
select division results having a differential component that is equal to or below a predetermined value from among a plurality of division results of the division between the one component of the baseband signal and the one component of the predetermined first synchronization word signal;
interpolate the selected division results; and
approximate the interpolated division results by a sine wave, and estimate a frequency offset based on an approximated sine wave.

9. The radio communication device according to claim 8, wherein the radio frequency integrated circuit generates the one component of the baseband signal by mixing the radio frequency signal and a local signal.

10. The radio communication device according to claim 8, wherein a frequency of the local signal is a mark frequency or a space frequency of the radio frequency signal.

11. The radio communication device according to claim 8, wherein the radio frequency signal is a packet signal in accordance with a Bluetooth Low Energy standard.

12. A radio communication method, comprising:
- performing division between one component of an in-phase component and a quadrature component of a baseband signal modulated by a minimum shift keying scheme and one component, of an in-phase component and a quadrature component of a predetermined first synchronization word signal, corresponding to the one component of the baseband signal;
- selecting division results having a differential component that is equal to or below a predetermined value from among a plurality of division results of the division between the one component of the baseband signal and the one component of the predetermined first synchronization word signal;
- interpolating the selected division results; and
- approximating the interpolated division results by a sine wave, and estimate a frequency offset based on the approximated sine wave.

* * * * *